Nov. 4, 1930.  A. B. CROUCH  1,780,223
PISTON AND PISTON RING ASSEMBLY
Filed Dec. 13, 1926   3 Sheets-Sheet 1
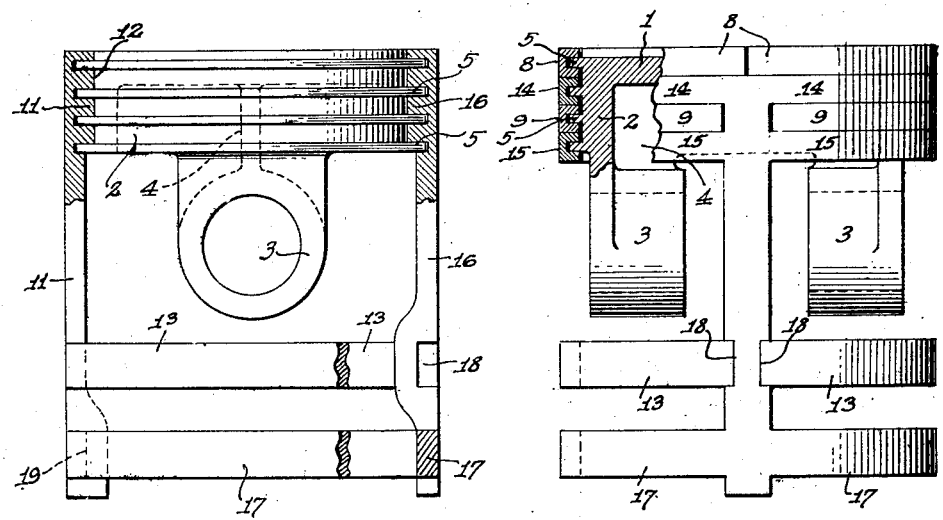
Fig.1.   Fig.2.
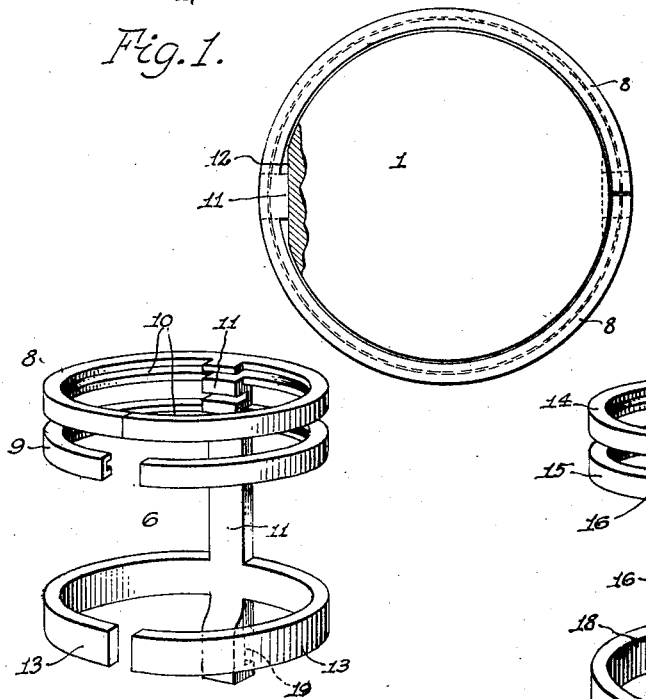
Fig.3.
Fig.4.   Fig.5.
Inventor
Artist B. Crouch,

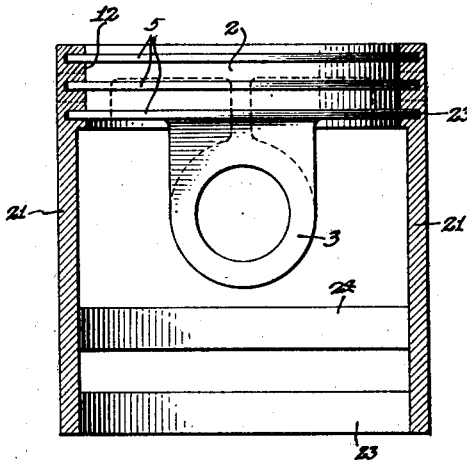
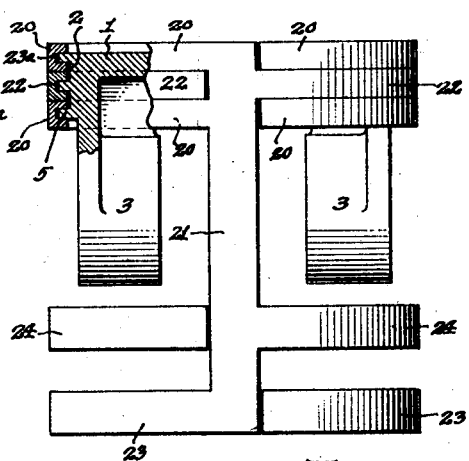
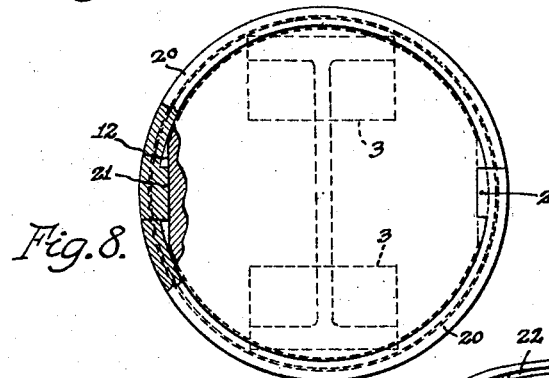
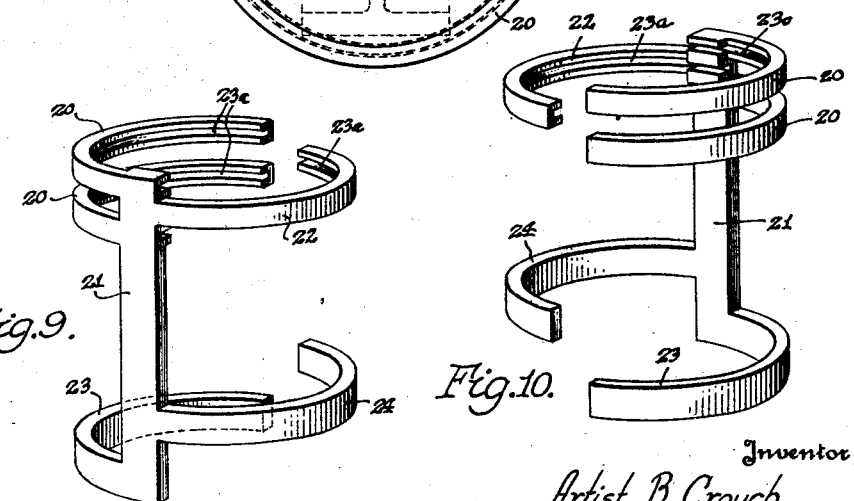

Nov. 4, 1930.  A. B. CROUCH  1,780,223

PISTON AND PISTON RING ASSEMBLY

Filed Dec. 13, 1926   3 Sheets-Sheet 3

Inventor
Artist B. Crouch,

By
Attorneys

Patented Nov. 4, 1930

1,780,223

UNITED STATES PATENT OFFICE

ARTIST B. CROUCH, OF DETROIT, MICHIGAN

PISTON AND PISTON-RING ASSEMBLY

Application filed December 13, 1926. Serial No. 154,540.

This invention relates to piston constructions and more particularly to piston and piston ring assemblies designed for use in internal combustion engines.

An object of the invention is to provide a piston construction of minimum weight thereby reducing the inertia thereof in operation, and to provide a ring construction which will effectually prevent leakage past the piston, thereby reducing loss of compression, dilution of crank case lubricant, and formation of carbon in the combustion chamber due to oil passing thereinto past said piston. It is also an object to provide certain new and useful features in the construction and arrangement of parts, all as will hereinafter more fully appear.

With the above and other ends in view, the invention consists in providing a skeleton piston structure and a skeleton ring structure mounted thereon to prevent the passage of fluid past the piston and to guide and prevent wear of the piston. The invention further consists in the construction whereby the skeleton ring structure and piston structures may be readily assembled, and when so assembled said ring structure will provide a series of packing rings with their sides in contact with each other, together forming a substantially continuous surface to engage the cylinder wall and arranged to provide a yielding pressure against the wall, and to block the passage of fluid past the piston behind the rings. The invention further consists in the construction and arrangement of parts and in other matters hereinafter set forth and more particularly pointed out in the appended claims, reference being had to the accompanying drawings in which—

Figure 1 is a piston and piston ring assembly illustrative of an embodiment of the present invention and showing the ring structure partially broken away and in section;

Figure 2 is a side elevation of Figure 1 with parts broken away and in section;

Figure 3 is a plan or end view of the same;

Figure 4 is a perspective view of one of a pair of mating ring structures detached;

Figure 5 is a view similar to that of Figure 4, of the other mating ring structure of the pair;

Figure 6 is a side elevation of a piston with a ring structure in vertical section thereon, and showing a modified construction;

Figure 7 is a side elevation taken at right angles to that of Figure 6 and showing portions broken away and in section;

Figure 8 is a top end view with portions broken away and in section;

Figures 9 and 10 are perspective views of a pair of skeleton ring structures showing the modified construction;

Figure 11:
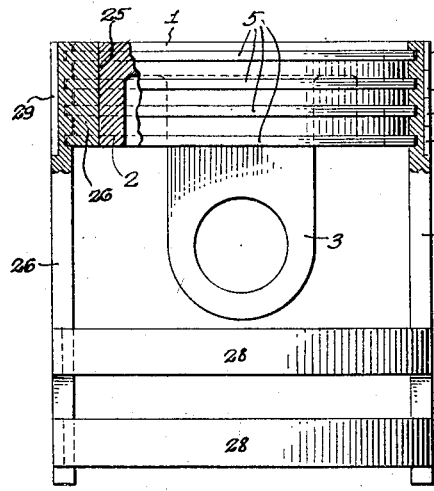
Figure 11 is a view similar to Figure 6 and showing a further modified construction.

As shown in the drawings, the piston comprises a head having a top end wall 1 and an integral angular depending side wall 2 arranged to carry packing rings, but is devoid of the usual skirt or sleeve which in the ordinary construction extends the full length of the piston.

Bearing ears 3 are formed integral with the end and angular side walls of the head and depending therefrom to provide laterally spaced apart bearings for the ends of the usual connecting rod pin, not shown. These ears are offset inwardly a short distance from the vertical plane of the outer surface of the wall 2 so that there will be a space between their outer sides and the wall of the cylinder within which the piston is to travel in use, and a strengthening and stiffening rib 4 is formed integral with these ears and with the walls of the head.

The wall 2 is formed with outwardly projecting, spaced apart annular ribs 5 for the locating of and attachment thereto of the packing ring skeleton structure hereinafter described.

The skeleton ring structure comprises the skeleton part indicated as a whole by the numeral 6 and shown in perspective detail in Figure 4, and the other part, indicated as a whole by the numeral 7 and shown in Figure 5, these skeleton parts 6 and 7 being constructed to interlock or fit together when mounted upon the piston and together form the skeleton ring structure. The skeleton part 6 comprises a pair of split expansion rings 8 and 9, each formed with an annular groove 10 in its inner side to receive therein, two of the ribs 5 on the piston head, these rings being connected together by an integral vertically disposed connecting bar 11 at the side of the rings diametrically opposite the split in these rings, and this bar is also grooved at its inner side to continue the grooves of the rings across this bar and also formed with like transverse grooves to receive the alternate ribs 5 not engaged by these rings 8 and 9. This bar projects inwardly of the inner faces of the rings and the piston head is cut away or flattened between the ribs 5, as at 12 to receive the inwardly projecting side of the bar so that when the skeleton ring member is assembled on the piston, said member is held against rotative movement upon the piston. The bar 11 is continued vertically downward below the lower ring 9 and formed integral therewith is a lower or skirt ring 13 which is also split diametrically opposite the connecting bar 11 to expand into contact with a cylinder wall when in use and guide the piston in its travel. The upper ring 8 has its split ends in substantially abutting relation and this ring embraces the uppermost rib 5 on the piston with its upper side in a plane slightly above the plane of the upper surface of the wall 1 of the head.

The second member of the skeleton ring structure is similar to that of the member just described except that the two upper rings 14 and 15 are adapted to engage over the ribs 5 not engaged by the rings 8 and 9 with the ring 14 lying within and filling the space between the rings 8 and 9, the split ends of and ring 14 being spaced apart to abut the sides of the bar 11, and the connecting bar 16 which corresponds to the bar 11 is provided near its lower end with an integral bottom ring 17 which in the assembly is below and spaced from the ring 13, and said bar 16 is also notched as at 18 above the ring 17 to receive the split and spaced apart ends of the ring 13. The bar 11 of the skeleton 6 is extended below the ring 13 a distance equal to the downward extension of the bar 16 and is notched as at 19 to receive the spaced apart split ends of the ring 17.

When the members 6 and 7 of the skeleton ring structure are assembled on the piston, all of the rings of one member are connected together by its connecting bar at one side of the piston and all of the rings of the other skeleton member are connected together at the opposite side of the piston by the connecting bar of that member, and the entire skeleton ring structure is attached to and held in place upon the piston by the engagement of the ribs 5 on the piston, within the grooves of the rings 8, 9, 14 and 15. When so assembled, said rings 8, 9, 14 and 15 lie side by side with their side faces substantially in contact with each other, said rings thus together forming in effect, an expansible sleeve in that their outer surfaces are combined to form a broad and in effect a continuous surface in contact with the cylinder wall. Because of the alternating of the rings of one member with those of the other, the joints between the split ends are not opposite each other, and no path is formed for the flow of fluid past these rings at the outer sides thereof, and as each ring is engaged over a separate continuous rib on the piston, leakage past the rings between them and the piston can occur.

In the modified construction shown in Figs. 6 to 10, inclusive, only three upper rings is provided and a like number of ribs is provided on the piston to be engaged by these rings, and each of these rings is made up of two half rings, one half being carried by one of the skeleton members, and the other half by the other member. The skeleton ring structure is therefore made up of two complementary parts which, when assembled, provide three top rings and two bottom rings, each part being formed with two parallel spaced apart half-rings 20 integral at one end with their connecting bar 21 to engage the piston at one side, and a single half-ring 22 integral with the opposite side of the bar to engage the opposite side of the piston, said half ring 22 being positioned directly opposite the space between the two rings at the other side. Each skeleton part is also formed with two half-rings 23 and 24, the half-rings 23 being integral with the bars 21 at the lower ends thereof and the halves 24 being both located at the same distance above the ring halves 23 so that when the two skeleton members are assembled on the piston the ring halves will together form two complete split and spaced apart guide rings for the piston. The half rings at the upper ends of the two skeleton parts are arranged so that when assembled on the piston the half ring 22 on one part will fit between the half rings 20 on the other part and all will be in alignment so that three complete split rings will be provided. The connecting bars 21 and the half-rings 20 and 22 are grooved upon their inner sides as at 23$^a$ to receive the ribs 5 on the piston head and the skeleton ring structure formed by the two parts is thus attached to and held in place upon the piston with the depending bars 21 and half-rings 23 and 24 serving the purpose of the guide skirt of the usual construction and the bottom rings usually provided therefor.

Figure 12:
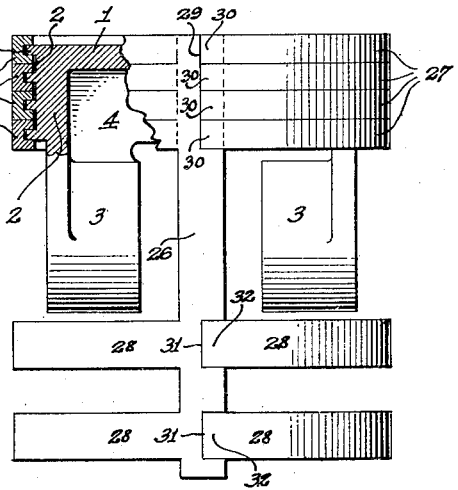
Figure 12 is a view similar to Figure 7 showing a further modified construction.
Figure 13:
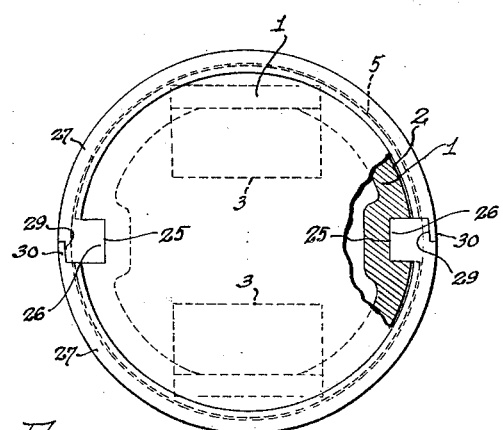
Figure 13 is a top plan view of Figures 11 and 12 with portions broken away and in section.
Figure 14:
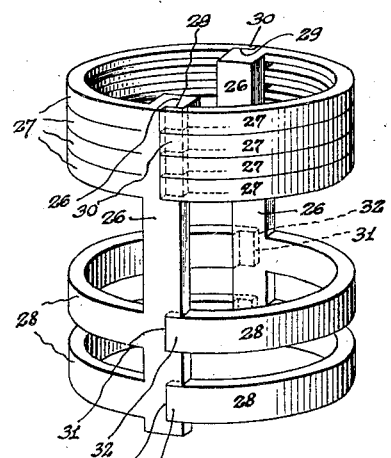
Figure 14 is a perspective view of a pair of ring structures together forming the skeleton ring structure shown in said further modification.

In Figs. 11 to 14 inclusive, a further modification of the skeleton ring structure is shown, the skeleton piston structure being substantially the same as that shown in Figs. 1 to 3 inclusive, the only difference being that the wall 2 of the piston head and ribs 5 thereon are provided with vertical grooves 25 at diametrically opposite sides of the piston to receive the inwardly projecting sides of the vertically extending connecting bars 26 of the skeleton ring structure. In this construction four top rings and two bottom rings are provided, one half of each of these several rings being formed integral at one end with the connecting bar 26 of that member or part of the skeleton structure, that is, the half rings 27 which form one half of the several top rings are integral at one end with one of the connecting bars 26 and all extend laterally in the same direction therefrom, and the half rings 28 which form one half of the two bottom rings are also formed integral with said bar and extend therefrom in the same direction as the half rings 27. Opposite the ends of the half-rings 27 which are integral with the bar, said bar is notched as at 29 to receive the end portions 30 of the half-rings 27 on the other half of the skeleton structure, which end portions are reduced in thickness, and in a like manner, the bars 26 are notched as at 31 opposite the integral ends of the half-rings 28 to receive the reduced free end portions 32 thereof. The complete skeleton ring structure therefore comprises right and left parts which may be quickly assembled on the piston with the piston ribs 5 engaged in the internal grooves of the rings and with the bars 26 engaging the vertical grooves 25 in the piston, by simply bringing the two parts into place against opposite sides of the piston, thus obviating the necessity for expanding or springing the ring members to enter the ribs in the grooves, and when the piston and ring structures are thus assembled and placed within a cylinder, the ring structure is held in place on the piston to move therewith and the ring structure is prevented from rotating upon the piston by the engagement of the connecting bars 26 with the grooves 25 in the piston.

Obviously other changes may be made in the construction and arrangement of parts, within the scope of the appended claims, without departing from the spirit of the invention, and I do not, therefore, limit myself to the particular constructions shown and described.

Having thus fully described my invention, what I claim is:—

1. A piston ring structure including a plurality of top rings to engage about a piston head, a bottom ring, and a portion connecting said top rings and said bottom ring and forming an integral skeleton ring structure.

2. A piston ring-structure including a plurality of split top rings, a split bottom ring spaced from said top rings, and a bar integral with said top and bottom rings and connecting said rings.

3. A piston ring-structure including structure parts each formed with spaced apart ring members and a uniting portion at a point diametrically opposite the split ends of the rings, the ring members of one part being adapted to fit within the spaces between the ring members of the other part with the uniting portions of each part between the split ends of the rings of the other part when said parts are assembled.

4. The combination of a piston head having an outer cylindrical surface meeting an upper end surface of said head at an angle and formed with spaced apart, integral, annular, parallel ribs projecting from said cylindrical surface with one of said ribs positioned adjacent said end surface of said head, and split rings to engage over said ribs with the adjacent sides of said rings in contact with each other and with the upper side surface of the ring engaging the rib at the end of said head, exposed, each of said rings being formed with an internal annular groove to receive said ribs.

5. A piston and piston ring-structure including a piston head having a plurality of angular ribs of rectangular form in cross section, a plurality of ring members each having a plurality of split rings, a bar connecting the rings of each ring member with said members extending laterally from said bar, and with said rings each formed with a groove of rectangular form in cross section in the inner side thereof arranged centrally of said inner side to receive annular ribs on a piston, the rings of one ring member being arranged to engage between the rings of the other ring member with said bar of one member between the split ends of the rings of the other member.

6. A piston and piston ring assembly including a piston head having an annular side wall, a skeleton ring assembly including top rings encircling said wall of said head and connected thereto, a bottom ring spaced from said top rings, and means connecting said rings to suspend said bottom ring from said top ring below said piston head.

7. A piston and piston ring assembly including a piston head, and a skeleton ring assembly including top and bottom ring members, said top ring member being formed to engage said head and hold thereto, means connecting said ring members together and spacing said bottom ring members from said top ring members, said connecting means holding said bottom ring members suspended below and free of said piston head.

8. A skeleton ring assembly including top ring members to engage a piston head and bottom split ring members and vertically extending connecting members connecting said top and bottom ring members, said bottom ring members providing a skirt portion for the piston.

9. The combination of a skeleton piston including an end wall and an annular side wall, with means carried by said walls providing bearings for a connecting rod pin with the longitudinal axis of said pin in a horizontal plane below the horizontal plane of the lower edge of said annular piston wall, and a skeleton ring assembly formed with top ring members to encircle said annular piston wall and connected thereto to move therewith, and with bottom ring members spaced from said top ring members and connected thereto and suspended therefrom free of said piston.

10. A skeleton ring assembly comprising two separate parts, each part including groups of ring members, and a connecting member connecting said ring members and holding the same in spaced relation, said ring members being formed integral with and extending laterally from said connecting member, said ring members on one part being offset longitudinally of the structure with ring members on one part fitting between the ring members on the other part to form sets of rings for the head and skirt portions of a piston.

11. A skeleton ring assembly comprising two separate parts, each part including spaced apart parallel ring members and a connecting member formed integral therewith with said members extending laterally therefrom, a ring member of one part being adapted to lie within the space between ring members of the other part when said parts are assembled.

12. A piston and piston ring assembly including a piston having a narrow annular depending wall formed with external annular ribs, and a skeleton ring assembly including top ring members formed with internal annular grooves to receive said annular ribs on the piston, said ring members having a combined width substantially equal to the width of said annular wall of the piston, said ring assembly also including bottom ring members spaced from said top ring members, and connecting members formed integral with and connecting all of said ring members, said bottom ring members being suspended by said connecting members from said top ring members and free of the piston.

13. The combination of a piston comprising an end wall and a depending annular side wall with ears depending from said wall and forming bearings at their lower ends below the place of the lower end of said annular wall, for a connecting rod pin, said annular wall being formed with external annular ribs and vertical grooves at diametrically opposite points thereof; and a skeleton ring assembly comprising top ring members formed with internal annular grooves to receive the annular ribs on the piston, and including bottom ring members and connecting bars formed integral with said ring members and projecting inwardly thereof to engage said vertical grooves in the piston, said bars forming connections between said top and bottom ring members to suspend said bottom ring members from said top ring members and free from and below said annular piston wall.

In testimony whereof I affix my signature.

ARTIST B. CROUCH.